United States Patent Office 3,455,912
Patented July 15, 1969

3,455,912
BENZODIOXAN-N-METHYLCARBAMATES
Alfred Eitel, Cologne-Buchheim, and Ingeborg Hammann, Cologne, Germany, assignors to Farbenfabriken Bayer Aktiengesellschaft, Leverkusen, Germany, a corporation of Germany
No Drawing. Filed Jan. 31, 1968, Ser. No. 701,874
Claims priority, application Germany, Feb. 25, 1967, F 51,642
Int. Cl. C07d *15/12;* A01n *9/20*
U.S. Cl. 260—340.3          5 Claims

ABSTRACT OF THE DISCLOSURE

Unsubstituted and 2- and/or 3-alkyl-substituted N-methylcarbamates of 5-hydroxy-1,4-benzodioxans which possess pesticidal, especially acaricidal and insecticidal, properties and which may be produced by reacting the corresponrding 5-hydroxybenzo-1,4-dioxan with methylisocyanate.

---

The present invention relates to and has for its objects the provision for particular new benzodioxan-N-methylcarbamates which possess pesticidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

It is known that 1-isopropyl-3-methyl-pyrazol-5-yl-N,N-dimethylcarbamate (A) as well as 3-methyl-4-dimethyl-aminophenyl-N-methylcarbamate (B) can be used for the control of insects (cf. Swiss Patent 282,655 and German Patent 1,145,162).

It has been found in accordance with the present invention that the particular new N-methylcarbamates of 5-hydroxy-1,4-benzodioxans having the formula

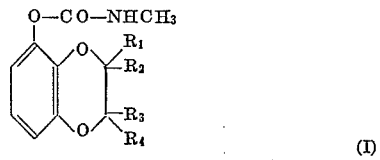

in which $R_1$, $R_2$, $R_3$ and $R_4$ each respectively is selected from the group consisting of hydrogen and lower alkyl, exhibit strong pesticidal, especially insecticidal and acaricidal, properties.

It has been furthermore found in accordance with the present invention that a versatile and smooth process for the production of the particular new benzodioxan-N-methylcarbamates of Formula I above in favorable yields may be provided, which comprises reacting the corresponding 5-hydroxy-1,4-benzodioxans having the formula

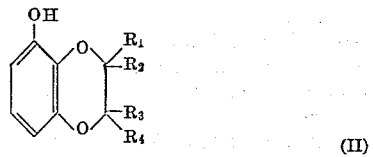

in which $R_1$ to $R_4$ are the same as defined above with methylisocyanate.

Surprisingly, the carbamates of the present invention show a higher insecticidal and acaricidal effectiveness than previously known carbamates, for example 1-isopropyl-3-methylpyrazol-5-yl-N-dimethylcarbamate (A).

The reaction for producing the instant compounds can be represented by the following formula scheme:

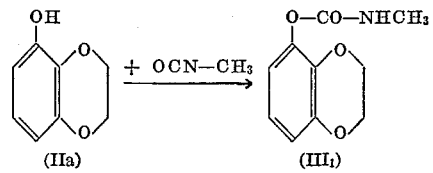

The reaction can be carried out in an inert solvent. Examples of suitable solvents include hydrocarbons, such as benzine or benzene, and ethers, such as dioxan. However, it is possible to react the reactants directly in the absence of solvents. The reaction is preferably accelerated by addition of a tertiary amine, for example trimethylamine. The reaction temperatures can be varied within a fairly wide range. In general, the work is carried out at from about 0 to 150° C.

The 5-hydroxy-1,4-benzodioxan and methylisocyanate used as starting materials are already known. The same is of course true of the other starting materials contemplated, i.e. the 2- and/or 3- alkyl-substituted-5-hydroxy-1,4-benzodioxans corresponding to those cases where $R_1$, $R_2$, $R_3$ and/or $R_4$ are lower alkyl.

Advantageously, the compounds of the present invention exhibit strong insecticidal and acaricidal properties. with low toxicity to warm-blooded animals and low phytotoxicity. The arthropodicidal actions set in rapidly and are long-lasting. The instant compounds can therefore be used with good results as active compounds for the control of noxious sucking and biting insects, Diptera as well as mites.

To the sucking insects contemplated herein there belong, in the main, aphids such as the peach aphid (*Myzus persicae*), the bean aphid (*Doralis fabae*); scales, such as *Aspidiotus hederae, Lecanium hesperidum, Pseudococcus maritimus;* Thysanoptera, such as *Hercinothrips femoralis;* and bugs, such as beet bug (*Piesma quadrata*) and the bed bug (*Cimex lectularius*); and the like.

With the biting insects contemplated herein there are classed, in the main, butterfly caterpillars, such as *Plutella maculipennis, Lymantria dispar;* beetles, such as granary weevils (*Sitophilus granarius*), the Colorado beetle (*Leptinotarsa decemlineata*), and also species living in the soil, such as the wireworms (Agriotes sp.) and larvae of the Cockchafer (*Melolontha melolontha*); cockroaches, such as the German cockroach (*Blattella germanica*); Orthoptera, such as the cricket (*Gryllus domesticus*); termites, such as Reticulitermes; Hymenoptera, such as ants; and the like.

The Diptera contemplated herein comprise in particular the flies, such as the vinegar fly (*Drosophila melanogaster*), the Mediterranean fruit fly (*Ceratitis capitata*), the house fly (*Musca domestica*) and gnats, such as the mosquite (*Aedes aegypti*); and the like.

In the case of the mites contemplated herein, particularly important are the spider mites such as the two-spotted spider mite (*Tetranychus urticae*), the European red mite (*Paratetranychus pilosus*); blister mites, such as the currant blister mite (*Eriophyes ribis*) and tarsonemids, such as *Tarsonemus pallidus;* and ticks; and the like.

The active compounds according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g.

surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and water; as well as dispersable finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

Such active compounds may be employed alone or in the form of mixtures with one another and/or with such solid or liquid dispersible carrier vehicles and/or with other known compatible active agents, especially plant protection agents, such as other acaricides, insecticides, fungicides, herbicides, bactericides, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001 and 20%, preferably 0.01–5%, by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g. surface-active agent, such as an emulsifying agent and/or a dispersing agent, and an amount of the active compound which is effective for the purpose in question and which is generally between about 0.00001 and 95%, and preferably 0.01–95%, by weight of the mixture.

In particular, the present invention contemplates methods of selectively controlling or combating pests, e.g. arthropods, i.e. insects and acarids, and more particularly, methods of combating at least one of insects and acarids which comprises applying to a least one of correspondingly (a) such insects, (b) such acarids, and (c) the corresponding habitat, i.e. the locus to be protected, a correspondingly combative amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The outstanding activity of the particular new compounds of the present invention is illustrated without limitation by the following examples:

EXAMPLE 1

Plutella test

Solvent: 3 parts by weight of dimethyl formamide
Emulsifier: 1 part by weight of alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100% means that all the caterpillars are killed whereas 0% means that none of the caterpillars are killed.

The particular active compounds tested, their concentrations, the evaluation time and the results obtained can be seen from the following Table 1.

TABLE 1

| Active compound | Concentration of active compound in percent | Degree of destruction in percent after 3 days |
|---|---|---|
| (A) 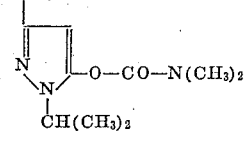 (known) | 0.2 | 90 |
| (III₂) 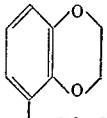 | 0.2 | 100 |
|  | 0.02 | 100 |

EXAMPLE 2

Phaedon larvae test

Solvent: 3 parts by weight of dimethyl formamide
Emulsifier: 1 part by weight of alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dripping wet and then infested with mustard beetle larvae (*Phaedon cochleariae*).

After the specified period of time, the degree of destruction is determined as a percentage: 100% means that all the beetle larvae are killed; 0% means that none of the beetle larvae are killed.

The particular active compounds tested, their concentrations, the evaluation time and the results obtained can be seen from the following Table 2:

TABLE 2

| Active compound | Concentration of active compound in percent | Degree of destruction in percent after 3 days |
|---|---|---|
| (A) CH₃<br>    \|<br>   N⎯⎯⎯O—CO—N(CH₃)₂<br>  ‖N<br>   CH(CH₃)₂<br>(known) | 0.2 | 70 |
| (III₃) [benzodioxan]<br>O—CO—NH—CH₃ | 0.2<br>0.02<br>0.002 | 100<br>100<br>100 |

EXAMPLE 3

Rhopalosiphum test (systemic action)

Solvent: 3 parts by weight of dimethyl formamide
Emulsifier: 1 part by weight of alkylarylpolyglycol ether To produce a suitable preparation of the particular active compound, 1 part by weight of such active compound is mixed with the stated amount of solvent containing the stated amount of emulsifier and the resulting concentrate is diluted with water to the desired final concentration.

Oat plants (*Avena sativa*) which have been strongly infested with oat aphids (*Rhopalosiphum padi*) are watered with the preparation of the given active compound so that the preparation penetrates into the soil without wetting the leaves of the oat plants. The active compound is taken up by the oat plants from the soil and thus reaches the infested leaves.

After the specified period of time, the degree of destruction is determined as a percentage: 100% means that all the aphids are killed whereas 0% means that none of the aphids are killed.

The particular active compounds tested, their concentrations, the evaluation time and the results obtained can be seen from the following Table 3:

EXAMPLE 4

(III₅) 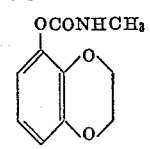

30 g. of 5-hydroxy-1,4-benzodioxan are dissolved in 75 ml. of benzene, and a little more than the corresponding molar amount of methylisocyanate is added slowly thereto. Three drops of trimethylamine are then added, the temperature rising to about 35° C. After some time, the precipitated solid product is filtered off with suction and washed first with benzene and finally with petroleum ether.

41 g. of N-methylcarbamate of 5-hydroxy-1,4-benzodioxan are obtained as a white powder of melting point 160° C. (99% of the theory).

EXAMPLE 5

Using corresponding molar amounts of each of the following 5-hydroxy-1,4-dioxan compounds with benzene and methylisocyanate, respectively, in accordance with the procedure of Example 4:

(a) 2-methyl-3-isobutyl-5-hydroxy-1,4-benzodioxan;
(b) 2,2-diethyl-3,3-di-n-butyl-5-hydroxy-1,4-benzodioxan;
(c) 2,3-dimethyl-5-hydroxy-1,4-benzodioxan;
(d) 2,3-di-n-butyl-2,3-di-n-propyl-5-hydroxy-1,4-benzodioxan;
(e) 2,2,3,3-tetra-methyl-5-hydroxy-1,4-benzodioxan;
(f) 2,2,3,3-tetraethyl-5-hydroxy-1,4-benzodioxan;
(g) 2,2-dimethyl-5-hydroxy-1,4-benzodioxan; and
(h) 3-methyl-5-hydroxy-1,4-benzodioxan;

the following corresponding final compounds are produced:

(a′) N-methylcarbamate of 2-methyl-3-isobutyl-5-hydroxy-1,4-benzodioxan;
(b′) N-methylcarbamate of 2,2-diethyl-3,3-di-n-butyl-5-hydroxy-1,4-benzodioxan;
(c′) N-methylcarbamate of 2,3-dimethyl-5-hydroxy-1,4-benzodioxan;
(d′) N-methylcarbamate of 2,3-di-n-butyl-2,3-di-n-propyl-5-hydroxy-1,4-benzodioxan;
(e′) N-methylcarbamate of 2,2,3,3-tetramethyl-5-hydroxy-1,4-benzodioxan;

TABLE 3

| Active compound | Concentration of active compound in percent | Degree of destruction in percent after 4 days |
|---|---|---|
| (B) (CH₃)₂N—[benzene ring]—O—CO—NH—CH₃<br>            \|<br>           CH₃<br>(known) | 0.2 | 20 |
| (III₄) [benzodioxan]<br>O—CO—NH—CH₃ | 0.2<br>0.02 | 100<br>90 |

The production process of the present invention is illustrated without limitation by the following further examples.

(f′) N-methylcarbamate of 2,2,3,3,-tetra-ethyl-5-hydroxy-1,4-benzodioxan;

(g′) N-methylcarbamate of 2,2-dimethyl-5-hydroxy-1,4-benzodioxan; and (h′) N-methylcarbamate of 3-methyl-5-hydroxy-1,4-benzodioxan.

Advantageously, in accordance with the present invention, in the foregoing formulae:

$R_1$, $R_2$, $R_3$ and $R_4$ each respectively represents straight and branched chain lower alkyl such as methyl, ethyl, n- and iso-propyl, n-, iso-, sec.- and tert.-butyl, especially methyl, ethyl, n- and iso-propyl, n-, iso- and s-butyl, and the like, and more particularly alkyl having 1–4 carbon atoms.

Preferably, $R_1$ and $R_3$ are the same, and $R_2$ and $R_4$ are the same. In particular, $R_1$ to $R_4$ are hydrogen or methyl, and especially hydrogen.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, i.e. both in the specification and claims, the terms "arthropod", "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. N-methylcarbamate of 5-hydroxy-1,4-benzodioxan having the formula

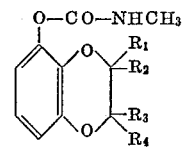

in which $R_1$, $R_2$, $R_3$ and $R_4$, each respectively, is selected from the group consisting of hydrogen and lower alkyl.

2. Carbamate according to claim 1 wherein $R_1$, $R_2$, $R_3$ and $R_4$, each respectively, is selected from the group consisting of hydrogen and $C_{1-4}$ alkyl.

3. Carbamate according to claim 1 wherein $R_1$ and $R_3$ are the same, and $R_2$ and $R_4$ are the same, and $R_1$ and $R_3$ are different from $R_2$ and $R_4$.

4. Carbamate according to claim 1 wherein $R_1$ and $R_3$ are $C_{1-4}$ alkyl, and $R_2$ and $R_4$ are hydrogen.

5. Carbamate according to claim 1 wherein such compound N-methylcarbamate of 5-hydroxy-1,4-benzodioxan having the formula

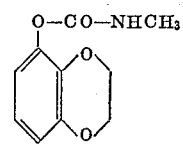

References Cited

UNITED STATES PATENTS 3,185,692   5/1965   Judd _____ 260—268

FOREIGN PATENTS 665,580   12/1965   Belgium.

ALEX MAZEL, Primary Examiner

JAMES H. TURNIPSEED, Assistant Examiner

U.S. Cl. X.R.

260—310; 424—278

PO-1050
(5/69)

UNITED STATES PATENT OFFICE
CERTIFICATE OF CORRECTION

Patent No. 3,455,912          Dated  July 15, 1969

Inventor(s)  Alfred Eitel and Ingeborg Hammann

It is certified that error appears in the above-identified patent and that said Letters Patent are hereby corrected as shown below:

Column 8, line 19, before "N-methylcarbamate" insert --is--

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents